Jan. 9, 1962 C. M. CEDERSTROM ET AL 3,016,230
HEAT EXCHANGE ASSEMBLY
Filed March 30, 1959
2 Sheets-Sheet 1
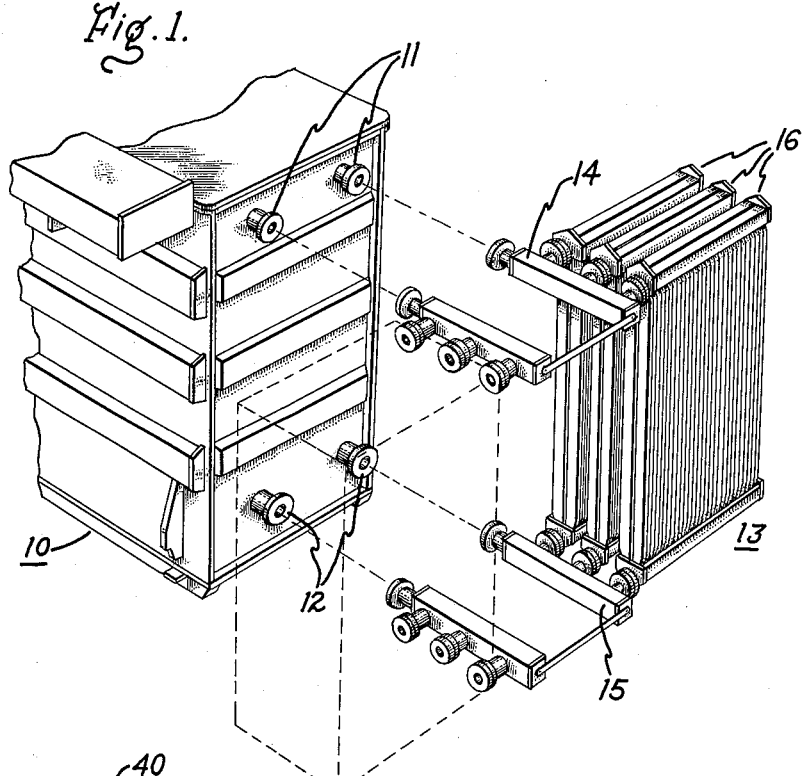
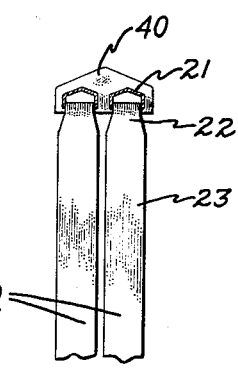
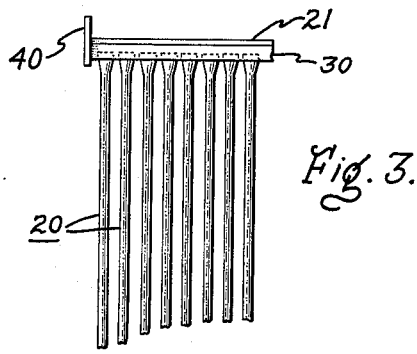
Inventors,
Curtiss M. Cederstrom,
Charles W. Mellyn,
by Gilbert P. Tarlton
Their Attorney.

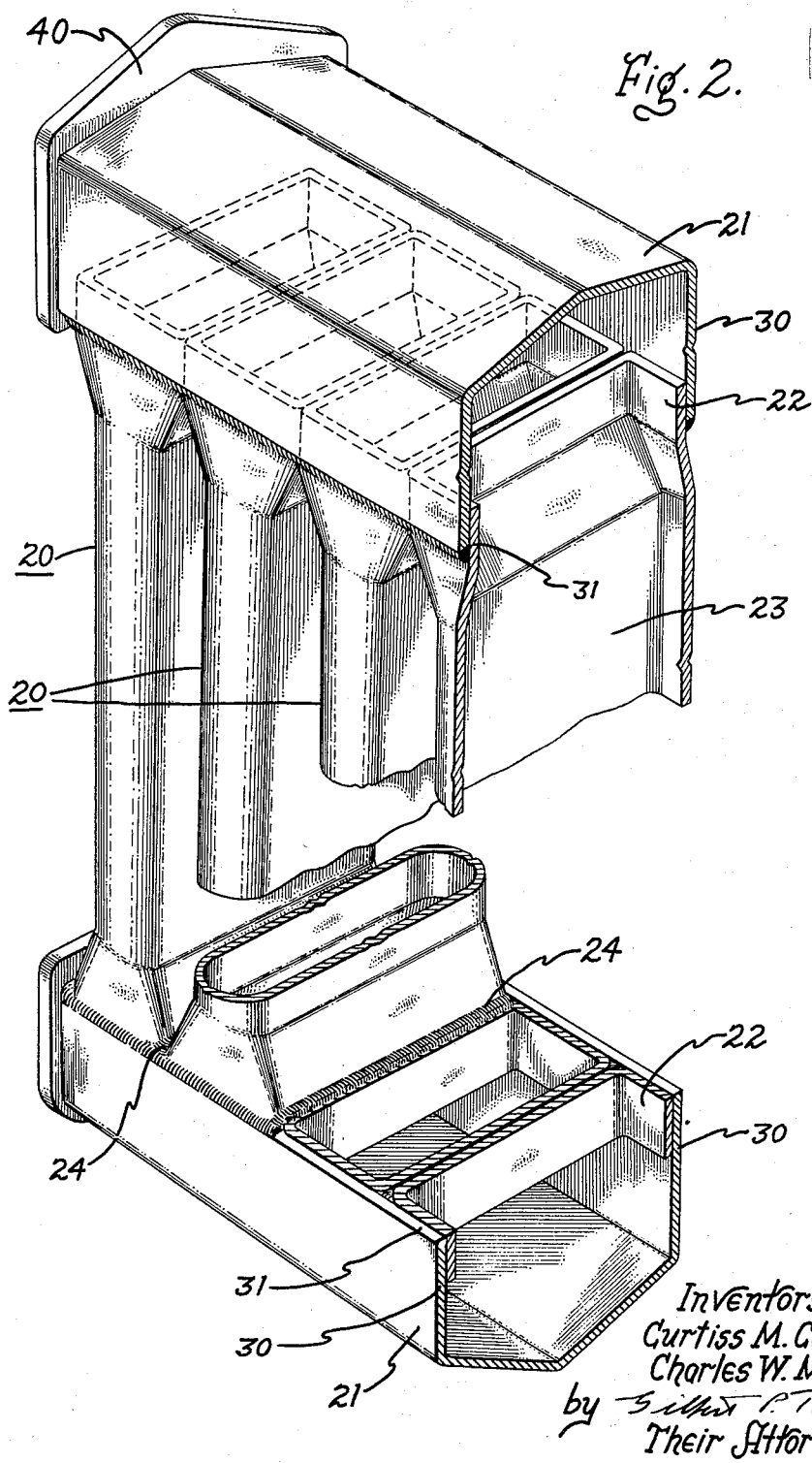

_United States Patent Office_ 3,016,230
Patented Jan. 9, 1962

3,016,230
HEAT EXCHANGE ASSEMBLY
Curtiss M. Cederstrom and Charles W. Mellyn, Pittsfield, Mass., assignors to General Electric Company, a corporation of New York
Filed Mar. 30, 1959, Ser. No. 802,682
6 Claims. (Cl. 257—154)

This invention relates to an improved heat exchange assembly, and more in particular to a readily fabricated and economic heat exchange assembly of the type in which heat is dissipated through the walls of a plurality of parallel tubular members from an internal fluid to the atmosphere. While the following specification discloses the invention as being particularly adapted for use in the circulation system of stationary electrical induction apparatus such as transformers, it will be obvious that the heat exchange assembly may be employed in other applications without departing from the spirit and scope of the invention.

Stationary electrical induction apparatus, such as transformers and the like, are frequently comprised of electrical windings and a magnetic core immersed in a dielectric liquid within a sealed enclosure. In the operation of such devices, it is frequently necessary to provide a circulation system for the removal of heat from the apparatus. Conventionally, such circulation systems include a heat exchange assembly disposed externally of the enclosure and connected thereto by suitable conduits.

In one previously employed type of heat exchange assembly, a plurality of parallel tubes having circular cross-sections were provided extending between a pair of parallel tubular cross-section header members, the header members being connected directly or by way of conduit means to the top and bottom of the enclosure. The heat exchange assembly was arranged so that the liquid within the enclosure would circulate, either by gravitational flow or forced flow, through the heat exchange tubes.

In this type of heat exchange assembly, the headers are provided with a plurality of drilled apertures into which the ends of the heat exchange tubes are assembled and welded. The ends of the tubes are frequently swaged in one or more steps to a reduced diameter. The swaging permits a greater distance between the outside of adjacent tube ends and also increases the tube end wall thickness to facilitate welding of the tubes to the header. The central portions of the tubes thus have thinner walls and larger diameters for increased heat transfer efficiency. While such heat exchange assemblies have been found satisfactory from a standpoint of dissipation of the required heat, they are difficult to fabricate and not readily adaptable to fabrication by automatic or semi-automatic processes. For example, it is difficult to adapt automatic welding apparatus to the non-planer circular welds between the heat exchange tubes and the headers.

It is, therefore, an object of this invention to provide an improved heat exchange assembly.

It is also an object to provide a readily fabricated and economical heat exchange assembly of a type comprising a plurality of parallel heat exchange tubes extending between a pair of parallel headers.

A still further object of this invention is to provide an improved heat exchange assembly of the type comprising a plurality of heat exchange tubes extending between a pair of parallel headers, the heat exchange assembly being characterized by the fact that substantially all joints are straight line joints so that the assembly is readily adaptable to automatic fabrication processes.

Briefly stated, in accordance with the invention, we provide a heat exchange assembly comprising a plurality of parallel tubular heat exchange members extending between a pair of parallel headers. The end portions of the heat exchange members have rectangular cross sections having greater width than the central portions of the heat exchange members. The heat exchange members may, for example, have flattened central portions. Adjacent heat exchange members are joined together along the lines at the transition between the end and central portions, the joints preferably being welded. The headers have U-shaped cross sections with the edge portions thereof extending around the end portions of the tubular members. The edges of the headers are joined to the end portions of the tubular members, preferably by welding, along straight line joints. To simplify the automatic welding of adjacent tubular members and headers, it is preferred that the joints between adjacent tubular members are coplanar with and join the joints between the tubular members and header.

While the specification concludes with claims particularly pointing out and distinctly claiming the subject matter which we regard as our invention, it is believed that the invention will be better understood from the following description taken in connection with the accompanying drawings.

In the drawings:

FIG. 1 is an exploded perspective view of one end of an electrical induction apparatus, such as a transformer, and including a heat exchange assembly such as may be fabricated according to the invention, FIG. 2 is an enlarged partially cross-sectional broken away view of a portion of a heat exchange assembly according to the invention, FIG. 3 is a side view of a portion of a heat exchange assembly of the type illustrated in FIG. 2, and FIG. 4 is a broken away end view of a typical heat exchange assembly according to the invention and employing a pair of parallel assemblies of the type illustrated in FIGURES 2 and 3.

Referring now to the drawings, and more in particular to FIG. 1, therein is illustrated an exploded view of one end of an electrical apparatus such as a transformer. The apparatus includes an enclosure 10, which is conventionally adapted to contain the transformer windings and core immersed in a dielectric liquid such as transformer oil. One or more flanged apertures 11 are provided extending through an upper wall of the enclosure 10, and one or more flanged apertures 12 in vertical alignment with the apertures 11 are provided in the lower portion of the wall of the enclosure 10. A radiator 13 is provided with an upper radiator adapter 14 to be connected to one of the upper flanged apertures 11 on the enclosure 10, and a lower radiator adapter 15 to be connected to one of the lower flanged apertures 12 in the enclosure 10. One or more banks of heat exchange assemblies 16 are provided extending between the upper and lower adapters 14 and 15 respectively. The heat exchange assemblies 16 and adapters 14 and 15 are arranged to permit the circulation of the dielectric liquid through the heat exchange assemblies 16 to dissipate the heat of the liquid to the atmosphere, thereby affecting the cooling of the apparatus. The liquid may flow through the radiator by natural gravity circulation, or if desired, pumps may be provided in any convenient location to force the liquid through the heat exchange assembly thereby affecting a more rapid removal of heat from the liquid. If desired, in order to further increase the removal of heat from the transformer, additional heat exchange assemblies may be employed between additional flanged apertures 11 and 12 of the enclosure, as illustrated in phantom in FIG. 1.

The arrangement of FIG. 1 is of course purely illustrative to show one application of the heat exchange assembly of this invention, and it will be obvious that other arrangements may be employed without departing from the spirit or scope of the invention. For example, the heat exchange assemblies 16 may, if desired, be connected directly to the enclosure 10.

Referring now to FIG. 2, therein is illustrated a partially cross-sectional view of a portion of one of the heat exchange assemblies of the apparatus of FIG. 1. As illustrated in this figure, the heat exchange assembly is comprised of a plurality of parallel coplanar heat exchange tubes 20 extending between a pair of parallel headers 21. The end portions 22 of the tubes 20 are formed with rectangular cross sections, and have greater widths (i.e., in the longitudinal direction of the headers 21) than the central portions 23 of the tubes 20. The tubes 20 are assembled so that the end portions 22 of adjacent tubes contact each other and the adjacent tubes are welded or otherwise rigidly sealed together at the lines of transition 24 between the rectangular end portions 22 and the reduced width central portions 23, with the welds being parallel and facing the central portions of the tubes.

The tubes 20 may be formed from flattened circular tubing, as illustrated in FIG. 2, with the end portions being formed into the desired rectangular shape by any conventional means. Since the end portions 22 have greater width than the central portions 23, the central portions of adjacent tubes 20 are spaced apart, thereby permitting the free passage of cooling fluid such as air across the outside surfaces of the tubes.

The headers 21 are comprised of elongated members having U-shaped cross sections. The parallel edges 30 of the headers 21 are assembled over the end portions 22 of the tubes 20. Preferably, the edges 30 of the header members 21 extend over the end portions of the tubes 20 as far as the lines of transition 24 between the central and end portions of the tubes 20. The extremities 31 of the edge portions of the header members 21 are then welded or otherwise rigidly sealed to the tubes 20.

Since the lines of transition 24 between the end and central portions of the tubes are straight lines, these joints may be readily welded by automatic processes. Similarly, the straight line joints between the extremities 31 of the header and the tubes 20 may also be readily automatically welded. The automatic fabrication of the heat exchange assembly is further simplified if the welds between adjacent tubes and between the tubes and the header are coplanar, as shown in FIG. 2, thereby eliminating the need for any additional welding of the tubes to the header. With this arrangement, all of the welded joints in the heat exchange assembly are readily accessible for inspection or repair.

The spacing between adjacent tubes to permit passage of air therethrough is achieved by making the end portions of the tubes wider than the central portions, thus eliminating the need for providing spaced apertures in the headers. Since no drilled apertures are required in the headers, these members may be readily and economically fabricated.

As illustrated in FIGURES 2 and 3, a flange 40 may be provided on one end of each of the headers to facilitate connection to the radiator adapters 14 and 15 as shown in FIG. 1. The flange 40 may be made sufficiently large that it serves as a flange for two or more banks of parallel heat exchange tubes 20. This arrangement permits the provision of a heat exchange assembly having desired heat transfer characteristics without necessitating the separate mounting for each bank of heat exchange tubes. For any particular application, of course, as illustrated in FIG. 1, a plurality of heat exchange assemblies may be connected between the radiator adapters 14 and 15, depending upon the required dissipation of heat from the cooling liquid within the transformer. Since the end portions 22 of the heat exchange tubes 20 are formed with greater widths than the central portions 23, it may be desirable that the depths of the end portions 22 be less than the depths of the central portions 23, as illustrated in FIG. 4, in order to eliminate excessive expansion of the walls of the tubes in forming the end portions 22 thereof. This arrangement also permits the use of headers 21 having smaller dimensions between their parallel edges 30.

It will be understood, of course, that, while the form of the invention herein shown and described constitutes the preferred embodiment of the invention, it is not intended herein to illustrate all of the possible equivalent forms or ramifications thereof. It will also be understood that the words employed are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. A heat exchange assembly comprising a plurality of parallel tubular heat exchange members extending between a pair of parallel headers, the end portions of said members having enlarged rectangular cross sections with greater dimensions than the corresponding dimensions of the central portions thereof, there being located inwardly of the ends of each member a line of transition between the greater dimensions of said rectangular end portions and those of said central portion, the ends of adjacent members being joined by visible welded joints extending along lines at the line of transition between the said rectangular end portions and said central portions, said headers having U-shaped cross sections with the edges extending over the end portions of said heat exchange members and being joined thereto by visible welded joints extending along lines coplanar with the welds joining the adjacent heat exchange members.

2. A heat exchange assembly comprising a plurality of parallel extending coplanar tubular heat exchange members extending between a pair of parallel headers, said heat exchange members having flat central portions with the greater dimensions extending transversely of the plane of said tubular members, and end portions with rectangular cross sections having greater width than said central portions, there being located inwardly of the ends of each member a line of transition between the greater width of said rectangular end portions and that of said central portions, the ends of adjacent members being joined by visible welded joints extending alone the lines of transition between the end portions and central portions thereof, said headers having U-shaped cross sections with the edges thereof extending around said end portions of said tubular members and being joined to said end portions by visible straight line welded joints coplanar with the welds joining adjacent heat exchange members.

3. A heat exchange assembly comprising a plurality of parallel extending coplanar tubular heat exchange members, the end portions of said members having rectangular cross sections with widths in the plane of said members greater than the widths of the central portions of said members, there being located inwardly of the ends of each member a line of transition between the greater widths of said rectangular end portions and those of said central portions, the end portions of adjacent members contacting each other and being joined together by visible welded joints along the lines of transition on the sides of said end portions toward said central portions, and header means having U-shaped cross sections with the parallel edges thereof extending around the ends of said heat exchange members and being joined to said members by visible welded joints extending along lines coplanar with the welds joining adjacent heat exchange members.

4. A heat exchange assembly comprising a plurality of parallel tubular heat exchange members extending between and joined to a pair of parallel headers, the end portions of said tubular members having rectangular cross sections with greater widths than the central portions thereof in the plane of said members, there being located inwardly of the ends of each member a line of transition between the greater widths of said rectangular end portions and those of said central portions, the ends of adjacent tubular members being joined along visible parallel lines in a plane normal to the axes of the tubular members at the line of transition between said rectangular and central portions, said headers having U-shaped cross sections with parallel edges extending around the end portions of said tubular members and being joined to said tubular members along visible lines normal to and joining the lines of junction between adjacent tubular members in said plane normal to the tube axes.

5. A heat exchange assembly comprising a plurality of parallel tubular exchange members extending between and joined to a pair of parallel headers, the end portions of said tubular members having rectangular cross sections with greater widths than the central portions thereof in the plane of said members, there being located inwardly of the ends of each member a line of transition between the greater widths of said rectangular end portions and those of said central portions, the ends of adjacent tubular members being joined together by visible welds extending along parallel lines in a plane normal to the axes of said tubular members at the lines of transition between said rectangular portions and central portions, said welds facing said central portions of said tubular members, said headers having U-shaped cross sections with parallel sides extending over the end portions of said tubular members and being joined to said tubular members by visible welds extending along lines normal to and joining the welds between adjacent tubular members in said plane normal to the tube axes.

6. A heat exchange assembly comprising a plurality of hollow elongated heat exchange tubes extending between and joined to a pair of parallel elongated headers, said heat exchange tubes having flattened central portions and enlarged end portions, said end portions having substantially rectangular cross sections, there being located inwardly of the ends of each member a line of transition between said enlarged end portions and said flattened central portions, said end portions of adjacent tubes being joined together by visible welds extending along parallel lines of transition facing said central portions, said headers enclosing the end portions of said tubes and being comprised of elongated members having U-shaped cross sections with parallel sides extending around the end portions of said tubes, the extremities of the edge portions of said elongated header members being joined to said tubes by visible welds extending along lines coplanar with and joining the welds between adjacent tubes.

References Cited in the file of this patent

UNITED STATES PATENTS

| | | |
|---|---|---|
| 1,766,654 | Kubler | June 24, 1930 |
| 1,994,903 | Warrender | Mar. 19, 1935 |
| 2,586,118 | Teller | Feb. 19, 1952 |